G. W. GARDINER.
INSULATOR FOR ELECTRIC INSTALLATION CANOPIES.
APPLICATION FILED SEPT. 12, 1910.
983,701.
Patented Feb. 7, 1911.
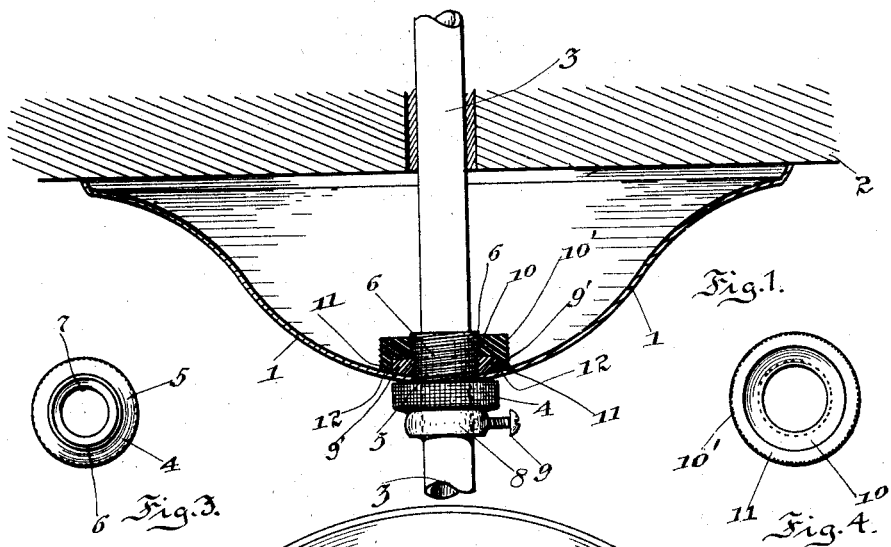
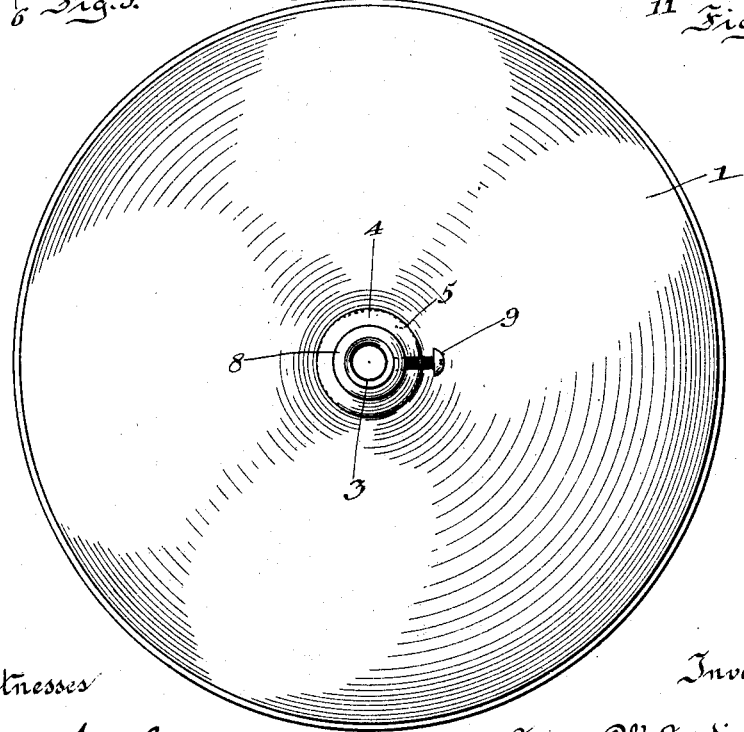

UNITED STATES PATENT OFFICE.

GEORGE W. GARDINER, OF CHICAGO, ILLINOIS.

INSULATOR FOR ELECTRIC INSTALLATION-CANOPIES.

983,701.  Specification of Letters Patent.  Patented Feb. 7, 1911.

Application filed September 12, 1910. Serial No. 581,485.

*To all whom it may concern:*

Be it known that I, GEORGE W. GARDINER, a citizen of the United States, and a resident of the city of Chicago, county of Cook, and State of Illinois, have invented certain new and useful Improvements in Insulators for Electric Installation-Canopies, of which the following is a specification.

My invention relates to improvements in insulators for electric installation canopies, the object being to produce a simple and effective insulator adapted to be secured in a canopy or cover for preventing loss of current therethrough.

A further object of my invention is to provide an insulator as stated which may be readily and permanently secured in position in the canopy.

Other objects will appear hereinafter.

With these objects in view my invention consists in the novel combination and arrangement of parts as will be hereinafter fully described and more particularly pointed out in the appended claim.

My invention will be best understood by reference to the accompanying drawings forming a part of the specification in which, Figure 1 is a sectional elevation of my invention in its preferred form, Fig. 2 is a bottom plan view thereof, Fig. 3 is a detail top plan view, and Fig 4 is a detail bottom plan view.

The preferred construction for carrying my invention into effect as illustrated in the accompanying drawings comprises a canopy 1 positioned below a ceiling 2, the ordinary metallic electric conduit 3 being secured to said ceiling in any suitable manner.

In order to secure the canopy 1 in position below the ceiling 2 and to insulate the conduit 3 from the latter, a hard rubber sleeve 4 having a shoulder 5, a threaded portion 6, and a cylindrical opening 7 is provided. The screwed portion 6 of sleeve 4 is passed through the central aperture of the canopy 1 thus causing the latter to seat on the shoulder 5. A circular metallic nut 9' is then screwed to the threaded portion 6 of the sleeve 4 which makes a secure connection between said sleeve and canopy. In order to lock the connection between the sleeve 4 and the canopy 5 and to render the same permanent, a hard rubber nut 10 is provided and screwed to the remaining threaded portion 6 of the sleeve 4, a knurled periphery 10 being provided on this nut in order that the same may be readily turned by hand. A circular flange 11 is provided on the nut 10 which embraces the nut 9' and contacts with the top of the surface 12 of the canopy 1. The nut 10 thus serves to lock the nut 9' in position, and to prevent the same from becoming loose and to render the connection permanent heat is applied to the flange 11 which causes the same to adhere or become vulcanized to the contiguous surfaces. The canopy is then placed in position on conduit 3 and secured in place by a circular ring 8 secured in position under the sleeve 4 by means of a set screw 9, said ring thus furnishes a support for the sleeve 4 and the canopy 1.

An insulator of the construction set forth is neat and compact in appearance and forms a reliable and durable insulation.

Having described my invention what I deem as new and desire to secure by Letters Patent is:

In an insulator of the character described, in combination with a canopy having a central opening, of a conduit passing through said opening, a hard rubber threaded sleeve arranged on said conduit and passed through said opening, a flange on said sleeve having a shoulder thereon on which said canopy is seated, a metallic nut screwed on said sleeve to hold said canopy in position on said shoulder, a metallic supporting ring arranged below said sleeve on said conduit, a set-screw in said ring for securing the same to said conduit, and a hard rubber lock-nut screwed to said sleeve and having a flange embracing said metallic nut and contacting with said canopy, said flange being secured to the latter by the application of heat, substantially as described.

In testimony whereof I have signed my name to this specification in the presence of two subscribing witnesses.

GEORGE W. GARDINER.

Witnesses:
 HELEN F. LILLIS,
 JOSHUA R. H. POTTS.